United States Patent Office
3,238,213
Patented Mar. 1, 1966

3,238,213
INDOLO COMPOUNDS AND THEIR PREPARATION

William Irving Taylor, Summit, N.J., assignor to Ciba Corporation, New York, N.Y., a corporation of Delaware
No Drawing. Filed Jan. 31, 1963, Ser. No. 255,228
58 Claims. (Cl. 260—287)

This is a continuation-in-part application of my application Serial No. 208,125, filed July 6, 1962, which in turn is a continuation-in-part application of my application Serial No. 181,150, filed March 20, 1962, both now abandoned.

The present invention concerns polyhydro-benz[g] indolo [3,2-a]quinolizine compounds having the ring system of the formula:

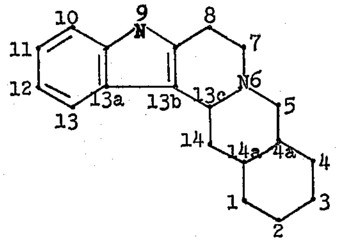

More particularly, it relates to the compounds of the formula:

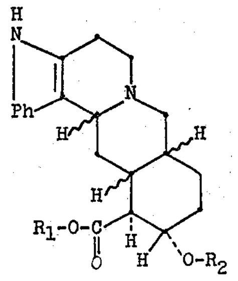

in which Ph is a 1,2-phenylene (o-phenylene) radical, $R_1$ is lower alkyl, lower alkoxy-lower alkyl or N,N-di-lower alkyl-amino-lower alkyl, and $R_2$ is hydrogen, the acyl radical of an organic acid or lower alkyl, or salts, N-oxides, salts of N-oxides or quaternary ammonium compounds thereof, as well as process for the manufacture of such compounds.

The 1,2-phenylene radical is represented by 1,2-phenylene or (lower alkoxy)-1,2-phenylene, primarily (methoxy)-1,2-phenylene, particularly 4-methoxy-1,2-phenylene, or 4,5-dimethoxy-1,2-phenylene.

The radical $R_1$ in the formula stands primarily for lower alkyl having from one to seven carbon atoms, e.g. methyl, ethyl, n-propyl, isopropyl, n-butyl, isobutyl, n-pentyl, isopentyl, n-hexyl, isohexyl, n-heptyl and the like. $R_1$ may also be lower alkoxy-lower alkyl or N,N-di-lower alkyl-amino-lower alkyl, in which lower alkoxy and N,N-di-lower alkyl-amino are separated from the carboxyl group by at least two carbon atoms of the lower alkyl portion; $R_1$ may, therefore, be represented, for example, by 2-lower alkoxy-ethyl, e.g., 2-methoxyethyl, 2-ethoxyethyl, 2-isopropyloxy-ethyl and the like, 2-lower alkoxy-1-methyl-ethyl, e.g., 2-methoxy-1-methylethyl and the like, 2-lower alkoxy-2-methyl-ethyl, e.g., 2-ethoxy-2-methyl-ethyl and the like, 3-lower alkoxypropyl, e.g., 3-methoxypropyl and the like, as well as by 2-N,N-di-lower alkyl-amino-ethyl, e.g., 2-N,N-dimethylaminoethyl, 2-N,N-diethylaminoethyl and the like, 3-N,N-di-lower alkyl-aminopropyl, e.g., 3-N,N-dimethylaminopropyl and the like, or any other equivalent substituted lower alkyl group representing $R_1$.

Although the substituent $R_2$ in the above formula may be the acyl radical of an organic acid, it stands primarily for hydrogen. An acyl radical of an organic carboxylic acid is especially the radical of an organic carboxylic acid having from one to fifteen carbon atoms, such as an aliphatic carboxylic acid, primarily an alkanoic acid, above all a lower alkanoic acid, e.g. acetic, propionic, butyric, pivalic, 2,2-dimethyl-butyric, as well as heptanoic, decanoic acid and the like, as well as a lower alkoxy-carbonic acid, e.g., methoxycarbonic, ethoxycarbonic acid and the like, an alkenoic acid, e.g., undecylenic acid and the like, a cycloalkane carboxylic acid, e.g., cyclohexane carboxylic acid and the like, a cycloalkyl-lower alkanoic acid, e.g., cyclohexylacetic, 3-cyclopentyl-propionic acid and the like, or any other suitable aliphatic carboxylic acid, or a carbocyclic aryl carboxylic acid, such as benzoic acid, a (lower alkyl)-benzoic acid, e.g., 4-methylbenzoic, 3,4,5-trimethylbenzoic, 4-ethyl-benzoic acid and the like, a (lower alkoxy)-benzoic acid, e.g., 4-methoxy-benzoic, 3,4-dimethoxy-benzoic, 3,4,5-trimethoxy-benzoic, 4-ethoxy-benzoic, 2,5-diethoxy-benzoic, 3,4,5-triethoxy-benzoic acid and the like, a (lower alkoxy-carbonyloxy)-benzoic acid, e.g., 4-methoxycarbonyloxy-benzoic, 4-ethoxycarbonyloxy-benzoic acid and the like, a (lower alkoxy-carbonyloxy)-(lower alkoxy)-benzoic acid, e.g., O-ethoxycarbonyl-syringic acid and the like, a (halogeno)-benzoic acid, e.g., 4-fluoro-benzoic, 4-chloro-benzoic, 3,4-dichloro-benzoic, 3-bromo-benzoic acid and the like, and (N,N-di-lower alkyl-amino)-benzoic acid, e.g. 3-N,N-dimethylamino-benzoic acid and the like, a carbocyclic aryl-aliphatic carboxylic acid, for example, a phenyl-lower alkanoic acid, e.g. phenylacetic, β-phenylpropionic acid and the like, a [(lower alkoxy)-phenyl]-lower alkanoic acid, e.g. (4-methoxy-phenyl)-acetic, β-(3,4,5-trimethoxy-phenyl)-propionic acid and the like, a phenyl-lower alkenoic acid, e.g., cinnamic acid and the like, a [(lower alkoxy)-phenyl]-lower alkenoic acid, e.g., 3,4,5-trimethoxy-cinnamic acid and the like, a [(lower alkoxy)-(lower alkoxy-carbonyloxy)-phenyl]-lower alkenoic acid, e.g., O-ethoxy-carbonyl-ferulic acid and the like, a heterocyclic aryl carboxylic acid, for example, a pyridine carboxylic acid, e.g., nicotinic, isonicotinic acid and the like, or any other suitable carboxylic acid, as well as the acyl radical of an organic sulfonic acid having at most fifteen carbon atoms, such as an aliphatic sulfonic acid, for example, a lower alkane sulfonic acid, e.g., methane sulfonic, ethane sulfonic acid and the like, or a carbocyclic aryl sulfonic acid, such as, for example, benzene sulfonic acid, a (lower alkyl)-benzene sulfonic acid, e.g. p-toluene sulfonic acid and the like, a (halogeno)-benzene sulfonic acid, e.g., 4-bromo-benzene sulfonic acid and the like, a (nitro)-benzene sulfonic acid, e.g., 3-nitro-benzene sulfonic, 4-nitro-benzene sulfonic acid and the like, or any other suitable organic sulfonic acid. $R_2$ may also be lower alkyl, e.g., methyl, ethyl, n-propyl, isopropyl and the like.

The hydrogen atoms in the 4a-position, the 13c-position and the 14a-position may have the α- or the β-configuration; preferably the 4a-hydrogen has the β-configuration, the 13c-hydrogen the a-configuration and the 14a-hydrogen the α-configuration.

Salts of the compounds of this invention are the acid addition salts, such as the pharmaceutically acceptable, non-toxic acid addition salts, for example, those with inorganic acids, e.g., hydrochloric, hydrobromic, sulfuric, phosphoric acid and the like, or with organic acids, such as organic carboxylic acids, e.g., tartaric, citric, maleic, succinic, citric acid and the like, or organic sulfonic acids, e.g., methane sulfonic, 2-hydroxy-ethane sulfonic, ethane 1,2-disulfonic, p-toluene sulfonic, naphthalene 2-sulfonic acid, camphor-10-sulfonic acid and the like. Other acid addition salts may be used, for example, as intermediates for the preparation of other salts, such as the pharmaceutically acceptable acid addition salts, or in the purification of the free compounds, as well as for identification and characterization purposes. Acid addition salts used for characterization purposes are, for example, those with acidic nitro compounds, e.g., picric, flavianic, picrolonic acid and the like, or with metal complex acids, e.g., phosphotungstic, phosphomolybdic, chloroplatinic, Reinecke acid and the like.

Also included within the scope of the invention are the N-oxides, which may form acid addition salts with acids, such as those with pharmaceutically acceptable, non-toxic acids, particularly the salts with the above-mentioned inorganic or organic acids.

The quaternary ammonium derivatives of the compounds of this invention are those with reactive esters of hydroxylated compounds, especially those with lower alkyl halides, e.g., methyl, ethyl, n-propyl or isopropyl chloride, bromide or iodide and the like, with di-lower alkyl-sulfates, e.g., dimethyl sulfate, diethyl sulfate and the like, with lower alkyl sulfonates, e.g. methyl or ethyl methane sulfonate, ethane sulfonate, 2-hydroxy-ethane sulfonate, p-toluene sulfonate and the like, or with any other suitable reactive ester of a hydroxylated compound.

The compounds of the present invention may be in the form of mixtures of isomers or of the single isomers.

The compounds have sedative and tranquilizing properties, as well as hypertensive and analeptic activites.

Compounds having sedative and tranquilizing effects are used to counteract agitation, overactiveness, nervousness and the like.

Compounds having hypertensive properties are useful to elevate the blood pressure, for example, in states of shock, during surgery and the like.

Compounds with analeptic effects are used as stimulants, for example, after administering or poisoning with narcotic or anesthetic drugs.

The above group of compounds may be represented by those having the following formula:

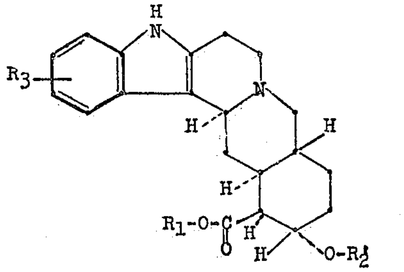

in which $R_1$ has the previously given meaning, representing primarily lower alkyl, $R_2'$ is hydrogen or the acyl radical of an organic carboxylic acid, and $R_3$ is hydrogen or lower alkoxy, especially methoxy, or salts of such compounds. Particularly useful are the lower alkyl 2α-hydroxy - 1α,2β,3,4aβ,5,7,8,9,13cα,14,14aα-dodecahydrobenz[g]indolo[3,2-a]quinolizine 1β-carboxylates and the pharmaceutically acceptable, non-toxic acid addition salts thereof.

Also included within the scope of this invention and having the above-mentioned properties are 4,4a,7,8,9,13cα,14,14a - octahydro-5H-indolo[3,2-a]pyrano[3,4-g]quinolizine compounds, especially those of the formula:

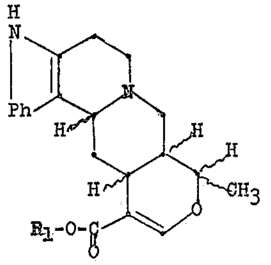

in which Ph and $R_1$ have the previously given meaning, such as the compounds of the formula:

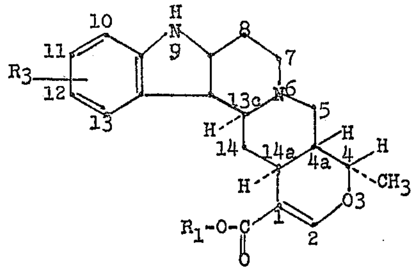

in which $R_1$ and $R_3$ have the previously-given meaning, salts, N-oxides, salts of N-oxides or quaternary ammonium compounds thereof; particularly useful are the lower alkyl 4α-methyl-4β,4aβ,7,8,9,13cα,14,14aα - octahydro-5H-indolo[3,2-a]pyrano[3,4-g]quinolizine 1 - carboxylates, or the pharmaceutically acceptable, non-toxic acid addition salts thereof.

The compounds of this invention may be used in the form of compositions for enteral or parenteral use, which contain the new compounds in admixture with a suitable organic or inorganic, solid or liquid carrier. For making up such compositions there can be employed substances which do not react with the essential ingredient, such as water, gelatine, lactose, starches, stearic acid, magnesium stearate, stearyl alcohol, talc, vegetable oils, benzyl alcohol, gums, propylene glycol, polyalkylene glycols or any other suitable carrier used for such preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other useful substances.

The compounds of the formula:

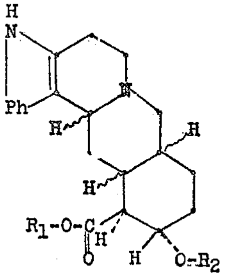

in which Ph, $R_1$ and $R_2$ have the previously given meaning, salts, N-oxides, salts of N-oxides or quaternary ammonium compounds thereof, are prepared by treating a compound of the formula:

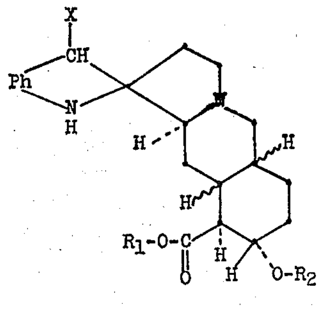

in which Ph, $R_1$ and $R_2$ have the previously given meaning, and X stands for hydroxyl or reactive esterified hydroxyl, or a salt thereof, with an acid reagent, and, if desired, converting a resulting salt into a free compound or into another salt, and/or, if desired, converting a resulting compound into an N-oxide or into a quaternary ammonium derivative thereof, and/or, if desired, converting a resulting compound or an N-oxide thereof into a salt thereof, and/or, if desired, converting a resulting quaternary ammonium derivative into another quaternary ammonium derivative, and/or, if desired, converting in a resulting compound an esterified carboxyl group into a free carboxyl group or into another esterified carboxyl group, and/or, if desired, converting in a resulting compound having a hydroxyl group, such group into an esterified or etherified hydroxyl group, and/or, if desired, converting in a resulting compound having an esterified hydroxyl group, such group into a hydroxyl group, and/or, if desired, separating a mixture of isomers into the single isomer, and/or, if desired, converting a resulting compound into an isomeric compound.

In the starting material, the group X stands above all for hydroxyl. As mentioned, it may also represent a reactive esterified hydroxyl group, such as hydroxyl esterified with an organic carboxylic acid, or, more especially, with an organic sulfonic acid, e.g., p-toluene sulfonic acid and the like; halogeno, e.g., chloro or bromo, representing a hydroxyl group esterified with a hydrohalic acid, also represents a suitable reactive esterified hydroxyl group X.

The above reaction is carried out by treating the starting material, preferably a solution thereof in a suitable solvent, such as a lower alkanol, e.g., methanol and the like, or any other appropriate diluent, with an acid reagent, for example, with an inorganic mineral acid, e.g., hydrochloric, hydrobromic, sulfuric acid and the like, an organic acid, e.g., p-toluene sulfonic acid and the like, a salt of a weak base with a strong acid, e.g. pyridine hydrochloride and the like, or any other suitable acid-type reagent. The reaction is preferably performed at an elevated temperature, if necessary, in a closed vessel and/or in the atmosphere of an inert gas, e.g. nitrogen.

The starting material used in the above reaction may be prepared, for example, by introducing into the 8a-position of a compound of the formula:

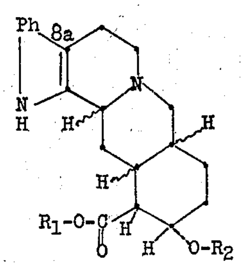

in which Ph, $R_1$ and $R_2$ have the previously given meaning, an acyloxy group, thus forming a compound of the formula:

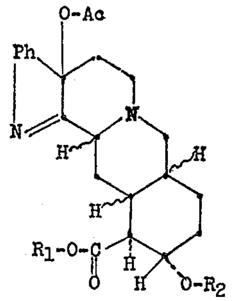

in which Ph, $R_1$ and $R_2$ have the previously given meaning, and Ac stands for the acyl radical of an organic carboxylic acid, and, if desired, after hydrolysis of the acyloxy group —OAc in the 8a-position into a hydroxyl group to form the compound of the formula:

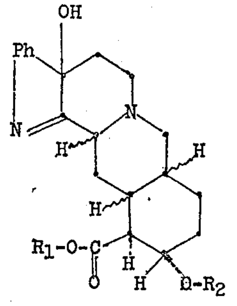

in which Ph, $R_1$ and $R_2$ have the previously given meaning, reacting the resulting compound with an alkaline reagent to form the compound of the formula:

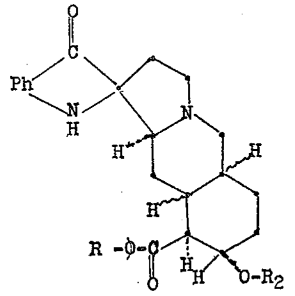

in which Ph, $R_1$ and $R_2$ have the previously given meaning, and reducing in the resulting compound the oxo group to the hydroxyl group, thus forming the desired starting material having the previously given formula; if desired, the free hydroxyl group of said starting material may be converted into a reactive esterified hydroxyl group according to known methods.

The above introduction of the acyloxy group —OAc is preferably carried out by treating the appropriate intermediate with a lead-IV acylate. Starting materials, in which the hydrogen atoms of the 4a-position and the 14a-position have the trans-configuration, may be treated with a lead-IV acylate of an aliphatic carboxylic acid, such as a lead tetra-lower alkanoate, especially lead tetraacetate and the like, as well as with a lead-IV acylate of a carbocyclic aryl carboxylic acid, such as benzoic acid, a (lower alkoxy)-benzoic acid, e.g., 4-methoxybenzoic, 3,4,5-trimethoxy-benzoic, and the like, a (halogeno)-benzoic acid, e.g., 3-bromo-benzoic, 4-bromo-benzoic and the like, a (nitro)-benzoic acid, e.g. 3-nitrobenzoic, 4-nitro-benzoic acid and the like, or any other carbocyclic aryl carboxylic acid, such as phthalic acid and the like. Starting materials, in which the hydrogen atoms of the 4a-position and the 14a-position have the cis-configuration, are preferably treated with a lead-IV acylate of a carbocyclic aryl carboxylic acid, such as one of those mentioned above.

The acylation reaction is carried out in a neutral medium, for example, in the presence of an inert (neutral) and sparingly polar solvent, such as benzene and the like, and at room temperature, if necessary, in the atmosphere of an inert gas, e.g. nitrogen. Contrary to the known dehydration of tetrahydro-β-carboline alkaloids (such as those of the yohimbine and reserpine series) to their corresponding dehydro and/or β-carbolinium compounds by treatment with lead tetraacetate in an acid medium (as described, for example, by Hahn et al., Ber., vol. 67, p. 686 (1934)), the above reaction with lead-IV acylates in a neutral medium and at room temperature yields exclusively the 8a-acyloxy compounds.

If desired, the acyloxy group of the 8a-position in the resutling compound may be hydrolized, for example, by reacting the latter with an alkaline reagent, such as an alkali metal hydroxide, e.g., sodium hydroxide, potassium hydroxide and the like, in a diluent, such as a lower alkanol, e.g., methanol and the like, or with any other suitable base; the hydrolysis may be carried out at room temperature or preferably while cooling.

The rearrangement of the resulting compound having either an acyloxy or a hydroxyl group in the 8a-position is carried out by treating it with an alkaline reagent, such as an alkali metal hydroxide, e.g., sodium hydroxide, potassium hydroxide and the like, preferably in a suitable diluent, such as an aqueous mixture of a lower alkanol, e.g. methanol and the like, or with an alkali metal lower alkoxide, e.g. sodium methoxide, potassium methoxide and the like, in a lower alkanol, e.g. methanol and the like, or with any other suitable alkaline reagent. The reaction is preferably performed at an elevated temperature, for example, between 40° and 100°, if necessary, in a closed vessel and/or in the atmosphere of an inert gas, e.g. nitrogen.

In the above hydrolysis and/or rearrangement reaction requiring alkaline conditions, an esterified hydroxyl group present in the starting material may be hydrolized to free hydroxyl; if desired, such hydroxyl group may be re-esterified according to known methods, for example, by treatment with an acid halide, e.g. chloride and the like, or an acid anhydride, preferably in the presence of a suitable base, e.g. pyridine and the like. Furthermore, under the above alkaline reaction conditions, a hydrogen atom in the 13b-position, having the β-configuration, is isomerized to have the α-configuration. If desired, an esterified carboxyl group in the rearrangement compound may be hydrolized and re-esterified or transesterified according to the methods described below.

The reduction of the oxo group in the resulting compound is carried out according to known methods, for example, by treating the keto-compound with a light metal hydride, e.g., sodium borohydride and the like, or any other suitable reducing reagent, such as catalytically activated hydrogen, e.g., hydrogen in the presence of a catalyst containing a metal of the eighth group of the Periodic System, e.g. platinum oxide and the like, a lower alkanol, e.g. isopropanol and the like, the presence of an aluminum lower alkanolate, e.g. aluminum isopropanolate and the like, according to the Meerwein-Ponndorf-Verley method and the like.

In the resulting compound, the hydroxyl group may be converted into a reactive esterified hydroxyl group according to known methods, for example, by treatment with an acid halide, e.g. p-toluene sulfonic acid chlorine and the like, under controlled conditions, so as to prevent a rearrangement to the polyhydrobenz[g]indolo[3,2-a] quinolizine compound. Furthermore, an esterified carboxyl group may be hydrolized and re-esterified or transesterified according to the methods described below.

The starting materials used in the procedure of this invention, and the intermediates used for their preparation are new and are intended to be included within the scope of the invention. Particularly useful are the compounds of the formula:

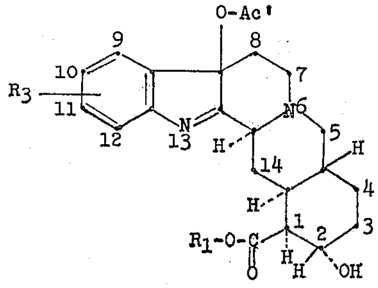

in which $R_1$ and $R_3$ have the previously given meaning, and Ac′ stands for the acyl radical of an aliphatic carboxylic acid, such as a lower alkanoic acid, e.g., acetic acid and the like, or the acyl radical of a carbocyclic aryl carboxylic acid, such as benzoic, a (loweralkyl)-benzoic acid, a (lower alkoxy)-benzoic, a (halogeno)-benzoic or a (nitro)-benzoic acid; these compounds are represented by the lower alkyl 8a-acyloxy-2α-hydroxy-1α, 2β, 3, 4, 4aβ, 5,7,8,8a,13bα,14,14aα - dodecahydro - benz[g]indolo [2,3-a]quinolizine 1β - carboxylates, in which acyl is acetyl, benzoyl or (halogeno)-benzoyl.

Other useful intermediates are those of the formula:

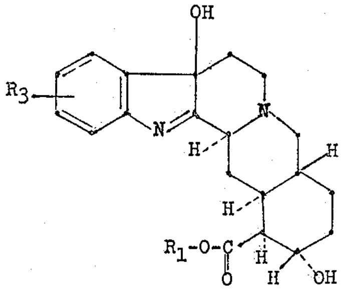

in which $R_1$ and $R_3$ have the previously given meaning, particularly the lower alkyl 2α,8a-dihydroxy-1α,2β,3,4, 4aβ,5,7,8,8a,13bα,14,14aα - dodecahydro - benz[g]indolo [2,3-a]quinolizine 1β-carboxylates.

Further useful intermediates are those having the formula:

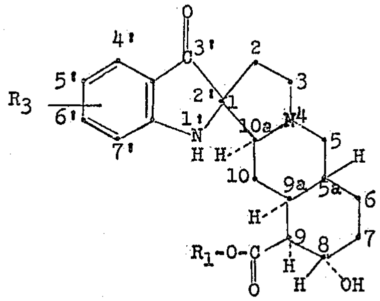

in which $R_1$ and $R_3$ have the previously given meaning, especially the lower alkyl 8α-hydroxy-3′-oxo-2,3,5aβ,6,7, 8β,9α,9aα,10,10aα-decahydro-5H - isoquinolino[2,3-a]pyrrolo-1-spiro-2′-indoline 9β-carboxylates, and the compounds of the formula:

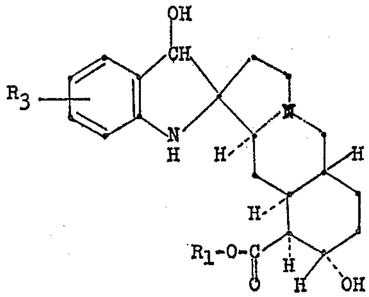

in which $R_1$ and $R_3$ have the previously given meaning, especially the lower alkyl 3′,8α-dihydroxy-2,3,5aβ,6,7,8β, 9α,9aα,10,10aα-decahydro-5H - isoquinolino[2,3-a]pyrrolo-1-spiro-2′-indoline 9β-carboxylates or the salts thereof. They are prepared according to the above-given procedure by selecting the appropriate starting materials.

The compounds of the formula:

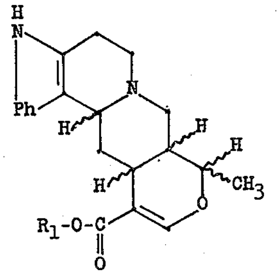

in which Ph and $R_1$ have the previously given meaning, salts, N-oxides, salts of N-oxides or quaternary ammonium compounds thereof, are prepared by treating a compound of the formula:

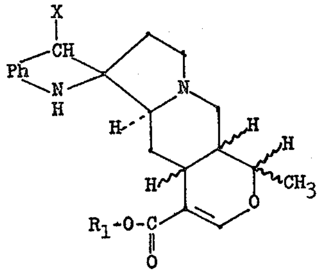

in which Ph, $R_1$ and X have the previously given meaning, or a salt thereof, with an acid reagent and, if desired, carrying out the optional steps.

The above reaction is performed according to the previously-described method; the starting materials used in the above reaction and intermediates used for their preparation are manufactured according to the above-outlined procedure. New and also intended to be included within the scope of this invention are the intermediates and starting materials used in the above procedure; such compounds are, for example, those having the following formula:

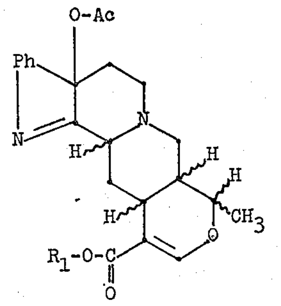

in which Ph, $R_1$ and Ac have the previously given meaning, such as those of the formula:

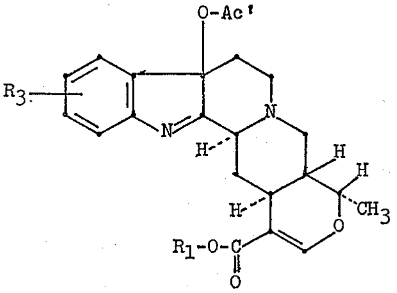

in which $R_1$, $R_3$ and Ac′ have the previously given meaning, particularly the lower alkyl 8a-acyloxy-4α-methyl-4β,4aβ,7,8,8a,13bα,14,14aα-octahydro - 5H-indolo[2,3-a] pyrano[3,4-g]quinolizine 1-carboxylates, in which acyl is acetyl, benzoyl or (halogeno)benzoyl, which may be hydrolized to the compounds having the formula:

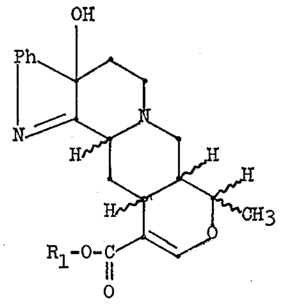

in which Ph and $R_1$ have the above-given meaning, such as those of the formula:

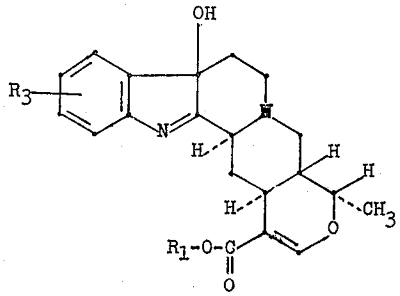

in which $R_1$ and $R_3$ have the previously given meaning, particularly the lower alkyl 8a-hydroxy-4α-methyl-4β,-4aβ, 7,8,8a,13bα,14,14aα - octahydro - 5H - indolo[2,3-a] pyrano[3,4 - g]quinolizine 1 - carboxylates; these compounds are then rearranged to those of the formula:

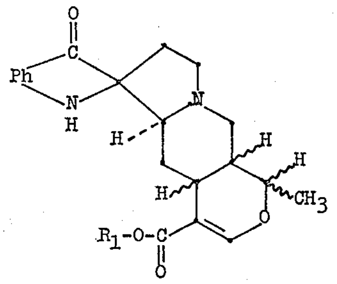

in which $R_1$ and Ph have the previously given meaning, such as those of the formula:

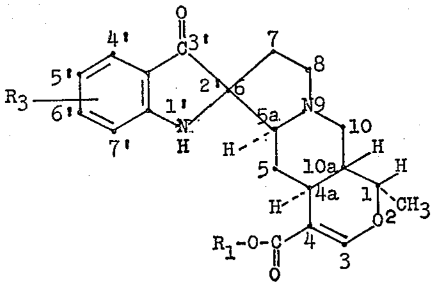

in which $R_1$ and $R_3$ have the above-given meaning, particularly the lower alkyl 1α-methyl-3′-oxo-4aα,10aβ-dihydro - 5aα - 1H - pyrano[3,4-f]indolizidino-6-spiro-2′-indoline 4-carboxylates, which may be reduced, and, if desired, esterified to form the starting materials of the previously given formula, such as those of the formula:

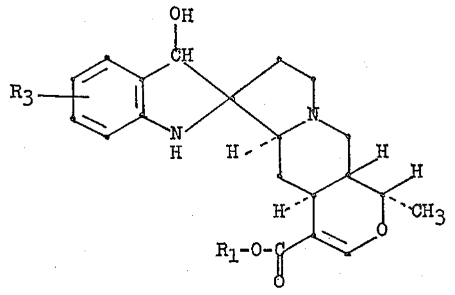

in which $R_1$ and $R_3$ have the previously given meaning, particularly the lower alkyl 3'-hydroxy-1α-methyl-4aα, 10aβ-dihydro-5aα-1H-pyrano[3,4-f]indolizidino-6-spiro-2'-indoline 4-carboxylates, or the salts of such compounds.

A resulting salt may be converted into the free compound, for example, by treatment with a suitable base, such as an alkali metal hydroxide, e.g., lithium hydroxide, sodium hydroxide, potassium hydroxide and the like, an alkali metal carbonate, e.g., sodium or potassium carbonate or hydrogen carbonate and the like, silver oxide, ammonia and the like, or with a suitable hydroxyl ion exchange preparation.

A resulting salt may be converted into another salt; for example, by reacting a salt with an inorganic acid may be heated with a metal salt of an acid, e.g. silver chloride, sodium maleate and the like, in a suitable solvent, in which a resulting inorganic salt is unsoluble and is thus removed from the reaction medium, or by reacting a resulting salt with an anion exchange preparation.

A free compound or the N-oxide thereof may be converted into a salt thereof, for example, by treating it with one of the previously-mentioned acids or with an anion exchange preparation, preferably in the presence of a suitable solvent or solvent mixture, or with a suitable ion exchange preparation and isolating the desired salt, which may contain water or solvent of crystallization.

A resulting compound may be converted into its N-oxide by treatment with an N-oxidizing reagent, such as hydrogen peroxide, persulfuric acid or with an organic percarboxylic acid, e.g., peracetic, perbenzoic, monoperphthalic acid and the like, preferably in the presence of a suitable solvent.

A quaternary ammonium derivative may be prepared by reacting the free compound with the reactive ester of a hydroxylated compound, such as one of the above-mentioned lower alkyl halides, sulfates or sulfonates; the quaternizing reaction is performed in the absence or presence of a solvent, and while cooling or at an elevated temperature, if necessary, in a closed vessel under pressure, and/or, in the atmosphere of an inert gas, e.g. nitrogen.

A resulting quaternary ammonium compound may be converted into another quaternary ammonium compound, for example, into the quaternary ammonium hydroxide, for example, by reacting a quaternary ammonium halide with silver oxide, a quaternary ammonium sulfate with barium hydroxide, or a quaternary ammonium salt with a suitable hydroxyl ion exchange preparation, or by electrodialysis. From a resulting quaternary ammonium hydroxide there may be prepared a quaternary ammonium salt by reacting it with an acid or any other suitable reagent. Furthermore, a quaternary ammonium salt may also be converted directly into another salt without the formation of a quaternary ammonium hydroxide; for example, a quaternary ammonium iodide may be reacted with freshly prepared silver chloride or with hydrogen chloride in methanol to yield the quaternary ammonium salt, or a quaternary ammonium salt may be reacted with an anion exchange preparation to be transformed into another salt.

In a resulting compound an esterified carboxyl group may be converted into another esterified carboxyl group, for example, by transesterification (e.g., treatment with a lower alkanol, a lower alkoxy-lower alkanol or an N,N-di-lower alkyl-amino-lower alkanol in the presence of a suitable transesterification reagent, such as an alkali metal lower alkanolate, an alkali metal lower alkoxy-lower alkanolate, benzyl trimethyl ammonium hydroxide and the like), or by hydrolysis (e.g., treatment with a suitable base, such as an alkali metal hydroxide in a mixture of a lower alkanol and water) and subsequent re-esterification (e.g., treatment with a lower diazo-alkane, a lower alkoxy-lower diazoalkane or an N,N-di-lower alkyl-amino-lower diazoalkane).

In a resulting compound having a free hydroxyl group, such group may be converted into an esterified hydroxyl group according to known methods, for example by treatment with an organic carboxylic acid halide, e.g., chloride and the like, or an organic carboxylic acid anhydride, preferably in the presence of a suitable base, e.g., pyridine and the like. A free hydroxyl group in a resulting compound may also be etherified according to known methods, for example, by treatment with a diazo compound of aliphatic character in the presence of a Lewis acid, e.g. fluoboric acid, aluminum chloride, an aluminum lower alkanolate (such as aluminum isopropanolate and the like) or any other suitable Lewis acid, or by any other method.

In a resulting compound having an acyloxy group, such group may be hydrolized to the free hydroxyl group, for example, by treatment with a base, such as an alkali metal hydroxide and the like.

A resulting mixture of isomers may be separated into the single isomers. Thus, a mixture of diastereoisomeric compounds or a mixture of compounds having different configurations may be separated into the individual isomers on the basis of physico-chemical differences. Resulting racemates may be resolved into the optically active d and l-forms according to known resolution procedures, using, for example, D-tartaric acid (l-tartaric acid) and L-tartaric acid (d-tartaric acid), as well as optically active forms of malic, mandelic, camphor 10-sulfonic, quinic acid and the like, as the optically active acids for salt formation. The optically active forms may also be isolated using biochemical methods.

A resulting compound may be converted into an isomeric compound having a different configuration. For example, upon treatment with an acidic reagent, such as one of those used for the formation of the compounds of this invention, an equilibrium between compounds of different configuration may be established and the resulting isomers may be separated taking into account their physico-chemical differences. It may, therefore, be possible, that the process for the manufacture of the compounds of this invention yields a mixture of isomeric compounds of different configuration, which may be separated into the single isomers.

The invention also comprises any modification of the process, wherein a compound formed as the intermediate at any stage of the process is used as starting material, and the remaining step(s) of the process is (are) carried out.

In the process of this invention those starting materials are preferably used which lead to final products mentioned in the specification as the preferred embodiments of the invention.

The following examples are intended to illustrate the invention and are not to be construed as being limitations thereon. Temperatures are given in degrees centigrade

*Example 1*

A solution of 1.66 g. of methyl 3',8α-dihydroxy-2,3,5αβ,6,7,8β,9α,9aα,10,10aα-decahydro-5H-isoquinoline-[2,3-a]pyrrolo-1-spiro-2'-indoline 9β-carboxylate in 150 ml. of methanol containing 5 ml. of 2N hydrochloric acid is refluxed for thirty minutes. The solution is concentrated under reduced pressure to 30 ml., and the precipitate is extracted into methylene chloride; the organic solution is dried and concentrated to dryness. The residue is crystallized from ethanol to furnish 1.01 g. of methyl 2α-hydroxy - 1α,2β,3,4,4aβ,5,7,8,9,13cα,14,14aα - dodecahydrobenz[g]indolo[3,2-a]quinolizine 1β-carboxylate of the formula:

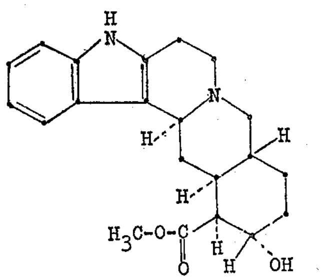

which melts at 250–252°; $[\alpha]_D^{26} = -89.4°$ (in chloroform); ultraviolet spectrum (in ethanol): $\lambda_{max.}$ 224 mμ (ε=37,120), 282 mμ (ε=7,060) and 289 mμ (ε=6,010); $\lambda_{min.}$ 246 mμ (ε=1,840) and 287 mμ (ε=4,870).

The starting material used in the above procedure is prepared as follows: To a mixture of 1.0 g. of yohimbine in 75 ml. of benzene is added 1.26 g. of lead tetraacetate in one portion. The solution turns orange and is filtered after five minutes; the filtrate is evaporated to dryness and the residue is dissolved in methylene chloride. The organic solution is filtered through a column of aluminum oxide (neutral, Woelm Activity III) to yield the methyl 8a - acetyloxy - 2α - hydroxy - 1α,2β,3,4,4aβ,5,7,8,8a,13bα,14,14*aα* - dodecahydro - benz[g]indolo[2,3 - a]quinolizine 1β-carboxylate, which is recrystallized from aqueous ethanol as the dihydrate, M.P. 123–124°; $[\alpha]_D^{27}$ +198° (in chloroform); ultraviolet absorption spectrum (in ethanol): $\lambda_{max.}$ 219 mμ (ε=30,820) and 264 mμ (ε=4,270); $\lambda_{min.}$ 236 mμ (ε=2,260).

A mixture of 8.95 g. of methyl 8a-acetyloxy-2α-hydroxy - 1α,2β,3,4,4aβ,5,7,8,8a,13bα,14,14aα - dodecahydro-benz[g]indolo[2,3-a]quinolizine 1β-carboxylate in 200 ml. of methanol and one mol equivalent of potassium hydroxide is allowed to stand overnight at room temperature and is then refluxed for three hours. The resulting solution is extracted with methylene chloride, the organic solution is washed with water, dried and evaporated to dryness. The residue is crystallized from methanol to yield 3.16 g. of the methyl 8α-hydroxy-3′-oxo-2,3,5aβ,6,7,8β,9α,9aα,10,10aα -decahydro - 5H - isoquinolino-[2,3-a]pyrrolo-1-spiro-2′-indoline 9β-carboxylate, which melts at 218°; $[\alpha]_D^{26}$=192° (in chloroform); ultraviolet absorption spectrum (in ethanol); $\lambda_{max.}$ 234 mμ (ε=23,=850) and 399–402 mμ (ε=3,840); $\lambda_{min.}$ 293 mμ (ε=240); $pK_a$ 5.4 (in a 4:1-mixture of 2-methoxy-ethanol and water).

The above compound may also be obtained as follows: A mixture of 1.0 g. of methyl 8a-acetyloxy-2α-hydroxy-1α,2β,3,4,4aβ,5,7,8,8a,13bα,14,14aα - dodecahydro - benz [g]indolo[2,3-a]quinolizine 1β-carboxylate in 10 ml. of methanol and 2.6 ml. of an 0.967 N solution of potassium hydroxide in methanol is allowed to stand at 0° for one day. Water is added and the organic material is extracted into methylene chloride. The organic solution is washed with water, dried and concentrated to dryness to yield 0.707 g. of the methyl 2α,8a-dihydroxy-1α,2β,3,4,4aβ,5,7,8,8a,13bα,14,14aα - dodecahydro - benz[g]indolo [2,3-a]quinolizine 1β-carboxylate, which melts at 187–190° after crystallization from ethyl acetate; $[\alpha]_D^{25}$= +224° (in chloroform); ultraviolet absorption spectrum (in ethanol): $\lambda_{max.}$ 218 mμ (ε=21,200) and 262 mμ (ε=4,230); $\lambda_{min.}$ 234 mμ (ε=2,120).

To a solution of 1.0 g. of methyl 2α,8a-dihydroxy-1α,2β,3,4,5aβ,5,7,8,8a,13bα,14,14aα - dodecahydro - benz[g] indolo[2,3-a]quinolizine 1β-carboxylate in aqueous methanol is added several drops of a 2 N aqueous solution of potassium hydroxide. The solution is boiled for one hour, cooled, diluted with water and then extracted into methylene chloride. The organic solution is dried, concentrated to dryness, and the residue is crystallized from methanol to yield the desired methyl 8α-hydroxy-3′-oxo-2,3,5aβ,6,7,8β,9α,9aα,10,10aα - decahydro - 5H - isoquinolino[2,3-a]pyrrolo-1-spiro - 2′ - indoline 9β-carboxylate, which is identical with the compound obtained according to the direct rearrangement procedure using the acetyloxy derivative.

To a solution of 4.0 g. of the methyl 8α-hydroxy-3′-oxo-2,3,5aβ,6,7,8β,9α,9aα,10,10aα - decahydro - 5H - isoquinolino[2,3-a]pyrrolo-1-spiro-2′-indoline 9β-carboxylate in 150 ml. of methanol is treated with 0.75 g. of sodium borohydride in water. After fifteen minutes, 100 ml. of water is added, and the organic material is extracted into methylene chloride; the organic solution is washed with water, dried and concentrated to dryness. The residue is crystallized from methylene chloride to yield the desired methyl 3′,8α - dihydroxy - 2,3,5aβ,6,7,8β,8α,9aα,10,10aα - decahydro-5H-isoquinolino[2,3-a]pyrrolo-1-spiro-2′-indoline 9β-carboxylate, which melts at 230–232° (with decomposition); $[\alpha]_D$= +89.6° (in ethanol); ultraviolet absorption spectrum (in ethanol): $\lambda_{max.}$ 246 mμ (ε=9,550) and 301 mμ (ε=2,240); $\lambda_{min.}$ 271 mμ (ε=620).

The starting material may also be prepared as follows: A mixture of 0.99 g. of methyl 8α-hydroxy-3′-oxo-2,3,5aβ,6,7,8β,9α,9aα,10,10aα - decahydro - 5H-isoquinolino [2,3-a]pyrrolo - 1 - spiro - 2′-indoline 9β-carboxylate and 0.103 g. of platinum oxide in 150 ml. of ethanol is stirred in an atmosphere of hydrogen for 24 hours. The catalyst is removed by filtration, and the filtrate is concentrated to dryness. The residue is crystallized from methanol; the crystalline material is filtered off, and the desired methyl 3′,8α - dihydroxy - 2,3,5aβ,6,7,8β,9α,9aα,10,10aα - decahydro - 5H-isoquinolino[2,3-a]pyrrolo-1-spiro-2′-indoline 9β-carboxylate is obtained by adding water to the filtrate, M.P. 224°. The infrared absorption spectrum shows that the compound is identical with the one resulting from the previously described method.

Other compounds, such as the

2-N,N-dimethylaminoethyl 2α-hydroxy-1α,2β,3,4,4aβ,5,7,8,9,13cα,14,14aα-dodecahydro-benz[g]indolo[3,2-a]quinolizine 1β-carboxylate,
methyl 2α-hydroxy-10-methoxy-1α,2β,3,4,4aβ,5,7,8,9,13cα,14,14aα-decahydro-benz[g]indolo[3,2-a]quinolizine 1β-carboxylate,
methyl 2α-hydroxy-11-methoxy-1α,2β,3,4,4aβ,5,7,8,9,13cα, 14,14aα-dodecahydro-benz[g]indolo[3,2-a]quinolizine 1β-carboxylate, and the like, are prepared according to the above procedure using the appropriate starting materials and intermediates for the preparation of the latter.

*Example 2*

A mixture of 0.35 g. of methyl 2α-hydroxy-1α,2β,3,4,4aβ,5,7,8,9,13cα,14,14aα - dodecahydro - benz[g]indolo [3,2-a]quinolizine 1βcarboxylate in 3 ml. of methyl iodide is refluxed for thirty minutes; the desired methyl 2α - hydroxy - 1α,2β,3,4,4aβ,5,7,8,9,13cα,14,14aα-dodecahydro - benz[g]indolo[3,2-a]quinolizine 1β - carboxylate methiodide precipitates and is crystallized from ethanol, M.P. 265-268°.

*Example 3*

A mixture of 0.4 g. of methyl 2α-hydroxy-1α,2β,3,4,4aβ,5,7,8,9,13cα,14,14aα - dodecahydro - benz[g]indolo [3,2-a]quinolizine 1β-carboxylate and 2 ml. of acetic acid anhydride in 30 ml. of pyridine is allowed to stand for one day, and is then diluted with methylene chloride. The solution is dried and evaporated to dryness to yield the methyl 2α-acetyloxy - 1α,2β,3,4,4aβ,5,7,8,9,13cα,14,14aα-dodecahydro - benz[g]indolo[3,2 - a]quinolizine 1β-carboxylate which is crystallized from diethyl ether, M.P. 159–161°.

*Example 4*

A solution of 1.0 g. of methyl 3'-hydroxy-1α-methyl-4aα - 10aβ - dihydro - 5aα - 1H - pyrano[3,4 - f]indolizidino - 6 - spiro - 2' - indoline 4 - carboxylate in 10 ml. of methanol is refluxed in the presence of 5 ml. of 2 N aqueous hydrochloric acid for thirty minutes. Water (5 ml.) is added, and the resulting solution is basified with ammonia. The desired methyl 4α-methyl-4β,4aβ,7,8,9,13cα,14,14aα - octahydro - 5H - indolo[3,2 - a]pyrano-[3,4-g]quinolizine 1-carboxylate of the formula:

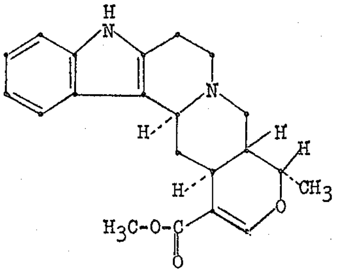

crystallizes and is filtered off, M.P. 220°; ultraviolet absorption spectrum (in ethanol): $\lambda_{max}$ 226 mμ (ε=44,000) and 292 mμ (ε=6,500), $[\alpha]_D$=−135° (in chloroform).

The starting materials used in the above procedure is prepared according to the method described in Example 1, i.e. by reacting ajmalicine with lead tetraacetate in benzene, and reacting the resulting methyl 8a-acetyloxy-4α - methyl - 4β,4aβ,7,8,8a,13bα,14,14aα - octahydro - 5H-indolo[2,3 - a]pyrano[3,4 - g]quinolizine 1 - carboxylate, M.P. 198°, $[\alpha]_D$=+256° (in chloroform), with potassium hydroxide to yield either directly the methyl 1α-methyl - 3' - oxo - 4aα,10aβ - dihydro - 5aα - 1H - pyrano-[3,4 - f]indolizidino - 6 - spiro - 2' - indoline 4 - carboxylate, M.P. 223°, $[\alpha]_D$=−203° (in chloroform), or the methyl 8a-hydroxy-4α-methyl-4β,4aβ,7,8,8a,13bα,14,14aα-octahydro - 5H - indolo[2,3 - a]pyrano[3,4 - g]quinolizine 1-carboxylate, M.P. 196–198°, $[\alpha]_D$=+282° (in chloroform), which upon further treatment with potassium hydroxide at an elevated temperature rearranged to the desired methyl 1α-methyl-3'-oxo-4aα,10aβ-dihydro-5aα-1H-pyrano[3,4 - f]indolizidino - 6 - spiro - 2' - indoline 4 - carboxylate; the latter is treated with sodium borohydride to form the methyl 3'-hydroxy-1α-methyl-4aα,10aβ-dihydro-5aα - 1H - pyrano[3,4 - f]indolizidino - 6 - spiro - 2' - indoline 4-carboxylate used as the starting material; it melts at 219°, $[\alpha]_D$=+50° (in chloroform).

*Example 5*

A solution of 1.066 g. of methyl 2α-hydroxy-1α,2β,3,4,4aβ,5,7,8,9,13cα,14,14aα - dodecahydro - benz[g]indolo-[3,2-a]quinolizine 1β-carboxylate (prepared according to the method described in Example 1) in 125 ml. of ethanol containing 2.8 ml. of a 2 N aqueous solution of potassuim hydroxide is refluxed for one hour. The solution is concentrated to a small volume and acidified to pH 6 with 2 N aqueous hydrochloric acid. The 2α-hydroxy-1α,2β,3,4,4aβ,5,7,8,9,13cα,14,14aα - dodecahydro - benz-[g]indolo[3,2-a]quinolizine 1β-carboxylic acid precipitates, is filtered off and purified by recrystallization from ethanol, M.P. 290–292°.

*Example 6*

A suspension of 0.8 g. of 2α-hydroxy-1α,2β,3,4,4aβ,5,7,8,9,13cα,14,14aα - dodecahydro - benz[g]indolo[3,2 - a] quinolizine 1β-carboxylic acid in methylene chloride is treated with a large excess of diazoethane in diethyl ether. After completion of the reaction, the mixture is concentrated to dryness and the ethyl 2α-hydroxy-1α,2β,3,4,4aβ,5,7,8,9,13cα,14,14aα - dodecahydro - benz[g]indolo[3,2-a] quinolizine 1β-carboxylate is obtained by crystallizing the residue from ethanol, M.P. 248–250°.

*Example 7*

A solution of 0.93 g. of ethyl 3',8α-dihydroxy-2,3,5aβ,6,7,8β,9α,9aα,10,10aα - decahydro-5H-isoquinolino[2,3-a] pyrrolo-1-spiro-2'-indoline 9β-carboxylate in methanol is acidified to pH 2–4 with 2 N aqueous hydrochloric acid and refluxed for thirty minutes. The solution is concentrated, basified and extracted with methylene chloride. The organic phase is dried over magnesium sulfate and evaporated to dryness to yield the crude ethyl 2α-hydroxy-1α,2β,3,4,4aβ,5,7,8,9,13cα,14,14aα - dodecahydro-benz[g] indolo[3,2-a]quinolizine 1β-carboxylate, which crystallizes from ethanol, M.P. 247–249°; $[\alpha]_D$=−117° (chloroform). The compound is identical with the product obtained according to the method described in Example 6.

The starting material used in the above procedure may be prepared as follows: A solution of 2.0 g. of methyl 8α-hydroxy - 3' - oxo-2,3,5aβ,6,7,8β,9α,9aα,10,10aα-decahydro-5H-isoquinolino[2,3 - a]pyrrolo-1-spiro-2'-indoline 9β-carboxylate in 25 ml. of a 2 N solution of potassium hydroxide in aqueous ethanol is refluxed for two hours. The ethanol is removed under reduced pressure, water is added and the resulting solution is brought to pH 6. The acidic material is extracted with methyl chloride; the desired 8α-hydroxy-3'-oxo-2,3,5aβ,6,7,8β,9α,9aα,10,10aα-decahydro - 5H - isoquinolino[2,3-a]pyrrolo-1-spiro-2'-indoline 9β-carboxylic acid precipitates from the organic extract, M.P. 194° (decomposition); $[\alpha]_D$=164° (methanol).

A solution of 1.5 g. of 8α-hydroxy-3'-oxo-2,3,5aβ,6,7,8β,9α,9aα,10,10aα - decahydro - 5H - isoquinolino[2,3-a] pyrrolo-1-spiro-2'-indoline 9β-carboxylic acid in ethanol is treated with an excess of diazoethane in methylene chloride. After completion of the reaction, the solution is concentrated, whereupon the ethyl 8α-hydroxy-3'-oxo-2,3,5aβ,6,7,8β,9α,9aα,10,10aα-decahydro-5H-isoquinolino-[2,3-a]pyrrolo-1-spiro-2'-indoline 9β-carboxylate crystallizes, M.P. 222–223°; $[\alpha]_D$=−220° (chloroform).

A solution of 0.394 g. of ethyl 8α-hydroxy-3'-oxo-2,3,5aβ,6,7,8β,9α,9aα,10,10aα-decahydro-5H-isoquinolino-[2,3-a]pyrrolo-1-spiro-2'-indoline 9β-carboxylate in 40 ml. of methanol is treated with 0.07 g. of sodium borohydride in one ml. of water. Water is then added, and the solution is extracted with methylene chloride; the organic phase is dried over magnesium sulfate, concentrated to dryness, and the residue is crystallized from methylene chloride to yield the ethyl 3',8α-dihydroxy-2,3,5aβ,6,7,8β,9α,9aα,10,10aα - decahydro-5H-isoquinolino[2,3-a] pyrrolo-1-spiro-2'-indoline 9β-carboxylate, M.P. 197–198°; $[\alpha]_D$=+75° (chloroform).

*Example 8*

A solution of 1.5 g. of methyl 2α-hydroxy-1α,2β,3,4,4aβ,5,7,8,9,13cα,14,14aα - dodecahydro - benz[g]indolo-[3,2-a]quinolizine 1β-carboxylate in 40 ml. of n-propanol containing five drops of benzyl trimethyl ammonium hydroxide, is refluxed under an atmosphere of nitrogen for twenty-five minutes and then concentrated to a small volume. Water is added; the precipitate is filtered off and taken up in 25 ml. of methylene chloride. The organic solution is washed with water, dried over magnesium sulfate and concentrated to dryness. The resulting n-propyl 2α-hydroxy - 1α,2β,3,4,4aβ,5,7,8,9,13cα,14,14aα - dodecahydro-benz[g]indolo[3,2-a]quinolizine 1β-carboxylate is crystallized from methylene chloride, M.P. 241–243° (with decomposition).

*Example 9*

A solution of 1.0 g. of methyl 2α-hydroxy-1α,2β,3,4,4aβ,5,7,8,9,13cα,14,14aα - dodecahydro - benz[g]indolo-[3,2-a]quinolizine 1β-carboxylate in 25 ml. of n-butanol containing five drops of benzyl trimethyl ammonium hydroxide, is refluxed under an atmosphere of nitrogen for twenty-five minutes, and concentrated to dryness. The residue yields the n-butyl 2α-hydroxy-1α,2β,3,4,4aβ,5,7,8,9,13cα,14,14aβ - dodecahydro - benz[g]indolo[3,2 - a] quinolizine 1β-carboxylate, which melts at 231–233° (with decomposition) after recrystallization from aqueous ethanol.

*Example 10*

A suspension of 1.4 g. of methyl 2α-hydroxy-1α,2β,3,4,4aβ,5,7,8,9,13cα,14,14aα - dodecahydro - benz[g]indolo-[3,2-a]quinolizine 1β-carboxylate in 25 ml. of 2-methoxyethanol containing five drops of benzyl trimethyl ammonium hydroxide is refluxed under an atmosphere of nitrogen for twenty-five minutes. The resulting solution is concentrated to a small volume and is taken up into methylene chloride; the solution is washed with water, dried over magnesium sulfate and concentrated. The resulting crystalline 2-methoxyethyl 2α-hydroxy-1α,2β,3,4,4aβ,5,7,8,9,13cα,14,14aα - dodecahydro - benz[g]indolo-[3,2-a]quinolizine 1β-carboxylate melts at 183–185°.

*Example 11*

To a solution of 0.645 g. of methyl 5′,6′-dimethyloxy-1α-methyl - 3′ - hydroxy - 4aα,10aα - dihydro - 5aα - 1H-pyrano]3,4 - f]indolizidino - 6-spiro - 2′ - indoline 4-carboxylate in 60 ml. of dry methanol is added 6 ml. of 1.1 N solution of hydrogen chloride in methanol. The reaction mixture is refluxed under an atmosphere of nitrogen, poured onto ice, and made basic with aqueous ammonia. The organic material is extracted with methylene chloride, the organic solvent is evaporated and the residue (0.606 g.) is chromatographed on aluminum oxide (neutral, Activity III). The methyl 11,12 - dimethoxy - 4α - methyl - 4β,4aα,7,8,9,13cβ,14,14aα - octahydro - 5H - indolo[3,2-a]pyrano[3,4-g]quinolizine of the formula

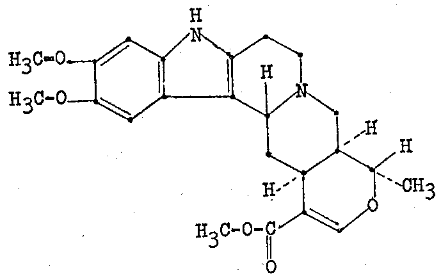

is eluted with methylene chloride containing 0.5 percent of methanol (yield: 0.221 g.), and crystallized from diethyl ether, M.P. 197–198°; $[\alpha]_D^{25}\pm O$, (in chloroform); ultraviolet absorption spectrum (in ethanol): $\lambda_{max.}$ at 226 mμ (ε=33570) and 303 mμ (ε=8680); infrared absorption spectrum (in chloroform): $\nu_{max.}$ at 3490 cm.$^{-1}$, 1695 cm.$^{-1}$ and 1623 cm.$^{-1}$ (without showing the bands characteristic for an α-hydrogen at the 13c-position). The methyl 11,12-dimethoxy-4α-methyl-4β,4aα, 7,8,9,13cα,14,14aα - octahydro - 5H - indolo[3,2 - a]pyrano[3,4 - g] quinolizine 1-carboxylate of the formula:

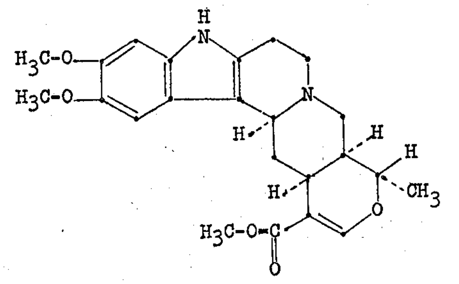

is eluted with methylene chloride (yield: 0.228 g.) and is recrystallized from diethyl ether, M.P. 203–205°; qualitative ultraviolet absorption spectrum (in ethanol); $\lambda_{max.}$ at 228 mμ and 300 mμ; infrared absorption spectrum (in chloroform); $\nu_{max.}$ at 3514 cm.$^{-1}$, 1700 cm.$^{-1}$ and 1643 cm.$^{-1}$ (showing the bands characteristic for an α-hydrogen at the 13c-position).

The starting material used in the above example is prepared as follows: A solution of 4 g. of iso-reserpiline in 250 ml. of methylene chloride is cooled in an ice-bath and treated with 9.8 g. of lead tetra-(3-bromo-benzoate) added in one portion while stirring. After stirring for eight minutes, the reaction mixture is poured onto a mixture of ice and a 10 percent aqueous solution of potassium hydrogen carbonate. The two layers are separated, the aqueous phase is extracted with methylene chloride, and the combined organic solutions are washed, dried over sodium sulfate and evaporated to yield 4.76 g. of a residue, which is chromatographed on aluminum oxide (neutral, Activity III). The main band (yield: 1.12 g.), eluted with a 1:1-mixture of methanol and methylene chloride, yields the methyl 8a-(3-bromo-benzoyl)-oxy-10,11 - dimethoxy - 4α - methyl - 4β,4aα,7,8,8a,13bα,14,14aα - octahydro - 5H - indolo[2,3 - a]pyrano[3,4 - g] quinolizine 1-carboxylate, which melts at 164–165° after recrystallization from diethyl ether; $[\alpha]_D^{25}=+135°$ (in chloroform); ultraviolet absorption spectrum (in ethanol): $\lambda_{max.}$ at 239 mμ (ε=48,000) and 294 mμ (ε=5,740); infrared absorption spectrum (in chloroform): $\nu_{max.}$ at 1736 cm.$^{-1}$, 1708 cm.$^{-1}$ and 1640 cm.$^{-1}$.

To a solution of 0.033 g. of sodium in 42 ml. of methanol is added 0.77 g. of methyl 8a-(3-bromo-benzoyl)-oxy - 10,11 - dimethoxy - 4α - methyl - 4β,4aα,7,8,8a,13bα,14,14aα - octahydro - 5H - indolo[2,3 - a]pyrano[3,4-g]quinolizine 1-carboxylate; the reaction mixture is refluxed for thirty minutes on the steam bath under an atmosphere of nitrogen, poured onto ice and extracted with methylene chloride. The organic extract is evaporated, and the residue (yield: 0.717 g.) is chromatographed on aluminum oxide (neutral, Activity III). The principal band (yield: 0.231 g.) is eluted with methylene chloride to yield the methyl 5′,6′-dimethoxy-1α-methyl-3′ - oxo - 4aα,10aα - dihydro - 5aα-1H - pyrano[3,4 - f] indolizidino-6-spiro-2′-indoline 4-carboxylate, which crystallizes with diethyl ether, M.P. 235–239°, and is recrystallized from methanol (yellow needles), M.P. 244–245°; $[\alpha]_D=-204°$ (in chloroform); ultraviolet absorption spectrum (in ethanol): $\lambda_{max.}$ at 224 mμ (ε=22,900), 251 mμ (ε=28,600), 283mμ (ε=11,750) and 405 mμ (ε=5,600); infrared absorption spectrum (in chloroform): $\nu_{max.}$ at 3450 cm.$^{-1}$, 1680 cm.$^{-1}$ and 1630 cm.$^{-1}$.

This compound may also be prepared as follows: A solution of 0.436 g. of reserpiline in 30 ml. of methylene chloride is cooled in an ice bath and treated while stirring with 0.468 g. of lead tetraacetate. Stirring is continued for five minutes; the reaction mixture is washed with ice-cold 10 percent aqueous solution of sodium hydrogen carbonate and water, dried over magnesium sulfate and evaporated. The residue (0.3 g.) is dissolved in benzene and filtered through a column of aluminum oxide (Activity III, neutral). Elution with methylene chloride gives 0.11 g. of residue, which yields the amorphous, pale-yellow methyl 8α-acetyloxy-10,11-dimethoxy - 4α - methyl - 4β,4aα,7,8,8a,13bβ,14,14aα - octahydro - 5H - indolo[2,3-a]pyrano[3,4-g]quinolizine 1-carboxylate. Upon treatment with sodium in methanol according to the procedure described above, this material is converted into the methyl 5′,6′ - dimethoxy-1α-methyl - 3′ - oxo - 4aα,10aα - dihydro - 5aα - 1H-pyrano-[3,4-f]indolizidino-6-spiro-2′-indoline 4-carboxylate.

To a solution of 0.6 g. of methyl 5′,6′-dimethoxy-1α-methyl - 3′ - oxo - 4aα,10aα - dihydro-5aα-1H-pyrano-[3,4-f]indolizidino-6-spiro-2′ - indoline 4-carboxylate in 600 ml. of methanol is added a large excess of sodium borohydride in portions. During the addition, the reaction mixture is allowed to reflux gently; refluxing is continued until the color fades. An additional 5.0 g. of sodium borohydride is added and refluxing is continued for an additional ten minutes. The reaction mixture is poured onto ice; the organic material is extracted with methylene chloride and the residue yields the desired methyl 5′,6′ - dimethoxy - 1α - methyl - 3′ - hydroxy-4aα,10aα - dihydro - 5aα-1H-pyrano[3,4-f]indolizidino-6-spiro-2′-indoline 4-carboxylate; qualitative ultraviolet absorption spectrum (in ethanol): $\lambda_{max.}$ at 310 mμ and 245 mμ; yield: 0.645 g.

*Example 12*

A mixture of 0.056 g. of ethyl 2α-hydroxy-1α,2β,3,4,4aβ,5,7,8,9,13cα,14,14aα - dodecahydro - benz[g]indolo[3,2-a]quinolizine 1β-carboxylate and 0.017 g. of maleic acid in 5 ml. of acetone is evaporated to dryness; the resulting ethyl 2α-hydroxy-1α,2β,3,4,4aβ,5,7,8,9,13cα,14,14aα-dodecahydro-benz[g]indolo[3,2-a] quinolizine 1β-carboxylate maleate is recrystallized from ethyl acetate, M.P. 210–213° (decomposition).

*Example 13*

To a solution of 0.069 g. of ethyl 2α-hydroxy-1α,2β,3,4,4aβ,5,7,8,9,13cα,14,14aα - dodecahydro - benz[g]indolo[3,2-a]quinolizine 1β-carboxylate in 5 ml. of methylene chloride is added 0.45 ml. of a 0.42 N solution of perbenzoic acid in chloroform while cooling. Upon standing, the ethyl 2α - hydroxy - 1α,2β,3,4,5aβ,5,7,8,9,13cα,14,14aα - dodecahydro-benz[g]indolo[3,2-a]quinolizine 1β-carboxylate N-oxide benzoate crystallizes and is filtered off, M.P. 222° (with decomposition).

What is claimed is:

1. A member selected from the group consisting of a compound of the formula:

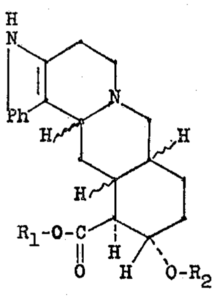

in which Ph is a member selected from the group consisting of 1,2-phenylene and (lower alkoxy) 1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic, acid and lower alkyl, an acid addition salt thereof, and N-oxide thereof, an acid addition salt of an N-oxide thereof and a lower alkyl quaternary ammonium salt thereof.

2. Lower alkyl 2α-hydroxy-1α,2β,3,4,4aβ,5,7,8,9,13cα,14,14aα-dodecahydro - benz[g]indolo[3,2 - a]quinolizine 1β-carboxylate.

3. Methyl 2α - hydroxy - 1α,2β,3,4,4aβ,5,7,8,9,13cα,14,14aα - dodecahydro - benz[g]indolo[3,2 - a]quinolizine 1α-carboxylate.

4. Ethyl 2α-hydroxy - 1α,2β,3,4,4aβ,5,7,8,9,13cα,14,14aα-dodecahydro - benz[g]indolo [3,2 - a]quinolizine 1β-carboxylate.

5. n-Propyl 2α - hydroxy - 1α,2β,3,4,4aβ,5,7,8,9,13cα,14,14aα - dodecahydro-benz[g]indolo[3,2-a]quinolizine 1β-carboxylate.

6. n-Butyl 2α - hydroxy - 1α,2β,3,4,4aβ,5,7,8,9,13cα,14,14aα - dodecahydro - benz[g]indolo[3,2-a]quinolizine 1β-carboxylate.

7. 2 - Methoxyethyl 2 - hydroxy - 1α,2β,3,4,4aβ,5,7,8,9,13cα,14,14aα - dodecahydro - benz[g]indolo[3,2-a]quinolizine 1β-carboxylate.

8. Methyl 2α - acetyloxy - 1α,2β,3,4,4aβ,5,7,8,9,13cα,14,14aα - dodecahydro - benz[g]indolo[3,2-a]quinolizine 1β-carboxylate.

9. 2α - Hydroxy - 1α,2β,3,4,4aβ,5,7,8,9,13cα,14,14aα-dodecahydro - benz[g]indolo[3,2 - a]quinolizine 1β-carboxylic acid.

10. Process for the manufacture of a member selected from the group consisting of a compound of the formula

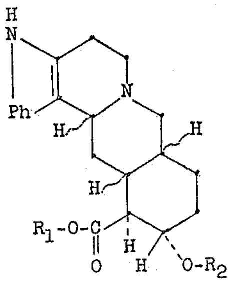

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower alkyl, and an acid addition salt thereof, which comprises treating a member selected from the group consisting of a compound of the formula

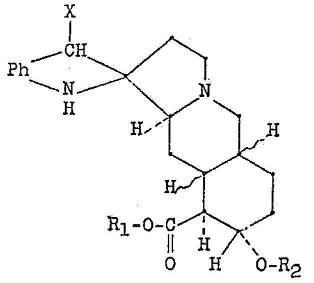

in which Ph, $R_1$ and $R_2$ have the previously given meaning, and X stands for a member selected from the group consisting of hydroxyl, hydroxyl esterified by p-tolene sulfonic acid, and halogeno, and a salt thereof, with an acid reagent selected from the the group consisting of an inorganic mineral acid and an organic acid.

11. Process according to claim 10, which comprises using an inorganic mineral acid as the acid reagent.

12. A compound of the formula:

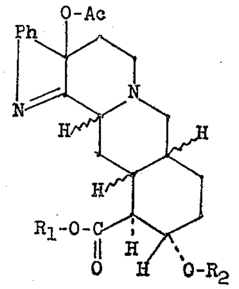

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower akyl, and Ac is the acyl radical of an acid selected from the group consisting of lower alkanoic acid, benzoic acid, (lower alkyl)-benzoic acid, (lower alkoxy)-benzoic acid, (halogeno)-benzoic acid, (nitro)-benzoic acid.

13. A compound of the formula:

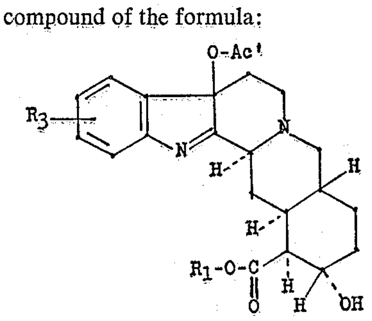

in which $R_1$ is a lower alkyl, $R_3$ is hydrogen, and Ac' is the acyl radical of a lower alkanoic acid.

14. Lower alkyl 8a - acetyloxy - 2α - hydroxy - 1α,2β,3,4,4aβ,5,7,8,8a,13bα,14,14aα - dodecahydro - benz[g]indolo[2,3 - a]quinolizine 1β-carboxylate.

15. Methyl 8a - acetloxy - 2α - hydroxy-1α,2β,3,4,4aβ,5,7,8,8a,13bα,14,14aα - dodecahydro-benz[g]indolo[2,3-a]quinolizine 1β-carboxylate.

16. A compound of the formula:

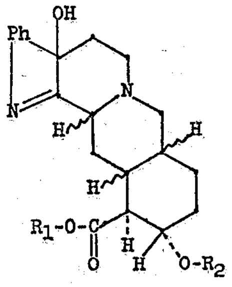

in which Ph is a member selected from the group consisting of 1,2-phenylene and (lower alkoxy)-1,2-phenylene, $R_1$ is a member selected from the group consisting of lower alkyl, lower alkoxy-lower alkyl in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower alkyl.

17. Lower alkyl 2α,8a - dihydroxy - 1α,2β,3,4,4aβ,5,7,8,8a,13α,14aα - dodecahydro-benz[g]indole[2,3-a]quinolizine 1β-carboxylate.

18. Methyl 2α,8a - dihydroxy - 1α,2β,3,4,4aβ,5,7,8,8a,13bα,14,14aα - dodecahydro - benz[g]indolo[2,3 - a]quinolizine 1β-carboxylate.

19. A compound of the formula:

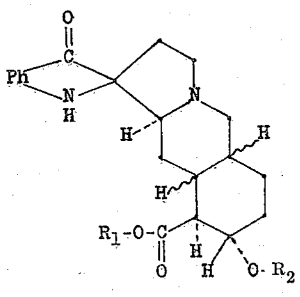

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower alkyl.

20. Lower alkyl 8α-hydroxy - 3' - oxo - 2,3,5aβ,6,7,8β,9α,9aα,10,10aα-decahydro - 5H - isoquinolino[2,3-a]pyrrolo-1-spiro-2'-indoline 9β-carboxylate.

21. Methyl 8α - hydroxy-3' - oxo-2,3,5aβ,6,7,8β,9α,9aα,10,10aα-decahydro-5H-isoquinolino [2,3 - a]pyrrolo - 1-spiro-2'-indoline 9β-carboxylate.

22. Ethyl 8α-hydroxy - 3' - oxo - 2,3,5aβ,6,7,8β,9aα,10,10aα - decahydro - 5H - isoquinolino[2,3 - a]pyrrolo-1-spiro-2'-indoline 9β-carboxylate.

23. 8α - Hydroxy - 3' - oxo - 2,3,4aβ,6,7,8β,9α,9aα,10,10aα - decahydro - 5H - isoquinolino[2,3 - a]pyrrolo-1-spiro-2'-indoline 9β-carboxylic acid.

24. A member selected from the group consisting of a compound of the formula

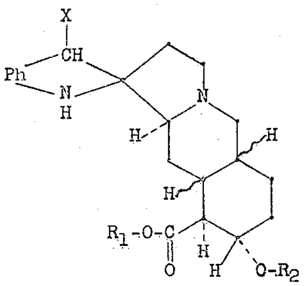

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, $R_2$ is a member selected from the group consisting of hydrogen, the acyl radical of a lower alkanoic acid and lower alkyl, and X is a member selected from the group consisting of hydroxyl, hydroxyl esterified by p-toluene sulfonic acid, and halogeno, and an acid addition salt thereof.

25. Lower alkyl 3',8α-dihydroxy - 2,3,5aβ,6,7,8β,9α,9aα,10,10aα - decahydro - 5H - isoquinolino[2,3-a]pyrrolo-1-spiro-2'-indoline 9β-carboxylate.

26. Methyl 3',8α-dihydroxy - 2,3,5aβ,6,7,8β,9α,9aα,10,10aα - decahydro - 5H - isoquinolino[2,3 - a]pyrrolo-α-spiro-1-indoline 9β-carboxylate.

27. Ethyl 3', 8α - dihydroxy - 2,3,5aβ,6,7,8β,9α,9aα,10,10aα - decahydro - 5H - isoquinolino[2,3 - a]-pyrrolo-1 - spiro - 2' - indoline 9β - carboxylate.

28. A member selected from the group consisting of a compound of the formula:

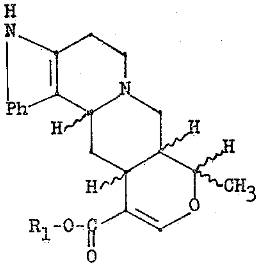

in which Ph is a member selected from the group consisting of 1,2-phenylene and (lower alkoxy)-1,2-phenylene, and $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, an acid addition salt thereof, an N-oxide thereof, an acid addition salt of an N-oxide thereof, and a lower alkyl quaternary ammonium salt thereof.

29. Lower alkyl 4α - methyl - 4β,4aβ,7,8,9,13cα,14,14aα - octahydro - 5H - indolo[3,2 - a]pyrano[3,4-g]quinolizine l-carboxylate.

30. Methyl 4α - methyl - 4β,4aβ,7,8,9,13cα,14,14aα-octahydro - 5H - indolo[3,2 - a]pyrano[3,4 - g]quinolizine l-carboxylate.

31. Methyl 11,12 - dimethoxy - 4α - methyl - 4β,4aα,7,8,9,13cα,14,14aα - octahydro - 5H - indolo[3,2 - a]pyrano[3,4-g]quinolizine l-carboxylate.

32. Process for the preparation of a member selected from the group consisting of a compound of the formula

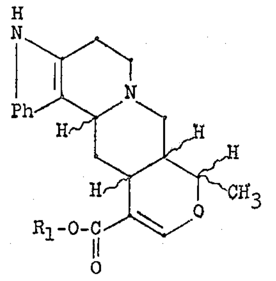

in which Ph is a member selected from the group consisting of 1,2-phenylene and (lower alkoxy)-1,2-phenylene, and $R_1$ is a member selected from the group consisting of lower alkyl, lower alkoxy-lower alkyl, in which lower alkoxy is separated from the carboxyl group by at least two carbo natoms, and N,N-di-lower alkyl-amino-lower alkyl, in which N,N-di-lower alkyl-amino is separated from the carboxyl group by at least two carbon atoms, and an acid addition salt thereof, which comprises reacting a member selected from the group consisting of a compound of the formula

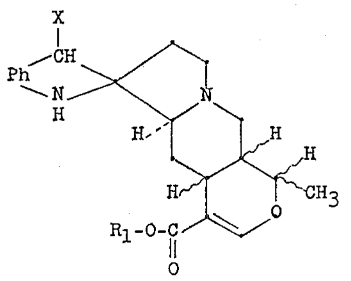

in which Ph and $R_1$ have the previously given meaning, and X stands for a member selected from the group consisting or hydroxyl, hydroxyl esterified by p-toluene sulfonic acid, and halogeno, and a salt thereof, with an acid reagent selected from the group consisting of an inorganic mineral acid and an organic acid.

33. Process according to claim 32 which comprises using an inorganic mineral acid as the acid reagent.

34. A compound of the formula:

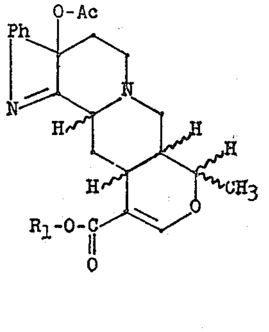

in which Ph is a member selected from the group consisting of 1,2-phenylene and (lower alkyl)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and Ac is the acyl radical of an acid selected from the group consisting of lower alkanoic acid, benzoic acid, (lower alkyl)-benzoic acid, (lower alkoxy)-benzoic acid, (halogeno)-benzoic acid and (nitro)-benzoic acid.

35. A compound of the formula:

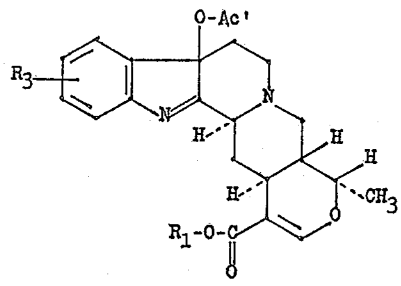

in which $R_1$ is lower alkyl, $R_3$ is hydrogen, and Ac' is the acyl radical of a lower alkonoic acid.

36. Lower alkyl 8a - acetyloxy - 4α - methyl - 4β,4aβ,7,8,8a,13bα,14,14aα - octahydro - 5H - indolo[2,3-a]pyrano[3,4-g]quinolizine 1-carboxylate.

37. Methyl 8a - acetyloxy - 4α - methyl-4β,4aβ,7,8,8a,13bα,14,14aα - octahydro - 5H - indolo[2,3-a]pyrano[3,4-g]quinolizine 1-carboxylate.

38. Methyl 8a - acetyloxy - 10,11 - dimethoxy - 4α-methyl - 4β,4aα,7,8,8a,13bβ,14,14aα - octahydro - 5H-indolo[2,3-a]pyrano 3,4-g]quinolizine 1 - carboxylate.

39. A compound of the formula:

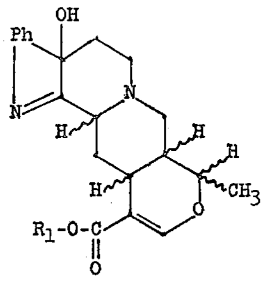

in which Ph is a member selected from the group consisting of 1,2-phenylene and (lower alkoxy)-1,2-phenylene, and $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms.

40. Lower alkyl 8a - hydroxy - 4α - methyl - 4β,4aβ,7,8,8a,13bα,14,14aα - octahydro - 5H - indolo[2,3-a]pyrano[3,4-g]quinolizine 1-carboxylate.

41. Methyl 8a - hydroxy - 4α - methyl - 4β,4aβ,7,8,8a,13bα,14,14aα - octahydro - 5H - indolo[2,3 - a]pyrano[3,4-g]quinolizine 1-carboxylate.

42. Methyl 10,11 - dimethoxy - 8a - hydroxy - 4α-methyl - 4β,4aα,7,8,8a,13bα,14,14aα - octahydro - 5H-indolo[2,3 - a]pyrano [3,4-g]quinolizine - 1 - carboxylate.

43. A compound of the formula:

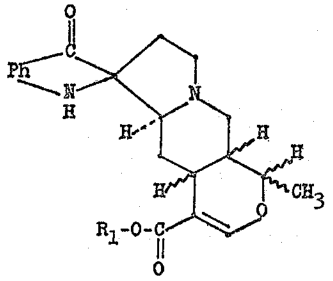

in which Ph is a member selected from the group consisting of 1,2 - phenylene and (lower alkoxy)-1,2-phenylene, and $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms.

44. Lower alkyl 1α - methyl - 3′ - oxo - 4aα,10aβ-dihydro - 5aα - 1H - pyrano[3,4 - f]indolizidino - 6-spiro-2′-indoline 4-carboxylate.

45. Methyl 1α - methyl - 3′ - oxo - 4aα,10aβ - dihydro-5aα - 1H - pyrano[3,4 - f]indolizidino - 6 - spiro - 2′-indoline 4-carboxylate.

46. Methyl 5′,6′ - dimethoxy - 1α - methyl - 3′ - oxo-4aα,10aα, -dihydro - 5aα - 1H - pyrano[3,4 - f]indolizidino-6-spiro-2′-indoline 4-carboxylate.

47. A member selected from the group consisting of a compound of the formula:

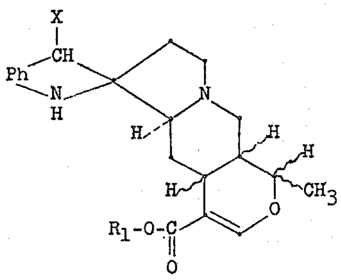

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and X is a member selected from the group consisting of hydroxyl, hydroxyl esterified by p-toluene sulfonic acid, and halogeno, and an acid addition salt thereof.

48. Lower alkyl 3′-hydroxy-1α-methyl-4aα,10aβ-dihydro - 5aα - 1H - pyrano[3,4 - f]indolizidino - 6 - spiro - 2′-indoline 4-carboxylate.

49. Methyl 3′ - hydroxy - 1α - methyl - 4aα,10aβ - dihydro - 5aα - 1H - pyrano[3,4 - f]indolinzidino - 6 - spiro-2′-indoline 4-carboxylate.

50. Methyl 5′, 6′ - dimethoxy - 3′ - hydroxy - 1α-methyl - 4aα,10aα - dihydro - 5aα - pyrano[3,4 - f]indolizidino-6-spiro-2′-indoline 4-carboxylate.

51. Process for the preparation of a compound of the formula:

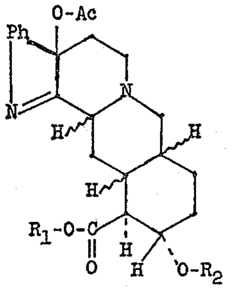

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower alkyl, and Ac is the acyl radical of an acid selected from the group consisting of lower alkanoic acid, benzoic acid, (lower alkyl)-benzoic acid, (lower alkoxy)-benoic acid, (halogeno)-benzoic acid and (nitro)-benzoic acid, which comprises reacting a compound of formula:

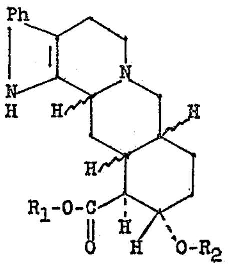

in which Ph, $R_1$ and $R_2$ have the previously given meaning, with a lead-IV acylate in which acyl is the acyl radical of an acid selected from the group consisting of lower alkanoic acid, benzoic acid, (lower alkyl)-benzoic acid, (lower alkoxy)-benzoic acid, (halogeno)-benzoic acid and (nitro)-benzoic acid, in a neutral medium.

52. Process according to claim 51, which comprises using lead tetraacetate as the lead-IV acylate.

53. Process for preparation of a compound of the formula:

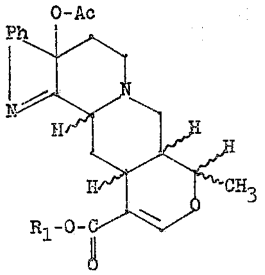

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxy group by at least two carbon atoms, and N,N-di-lower alkyl-amino-lower alkyl, in which N,N-di-lower alkyl-amino is separated from the carboxyl group by at least two carbon atoms, and Ac is the acyl radical of an acid selected from the group consisting of lower alkanoic acid, benzoic acid, (lower alkyl)-benzoic acid, (lower alkoxy)-benzoic acid, (halogeno)-benzoic acid and (nitro)-benzoic acid, which comprises reacting a compound of the formula:

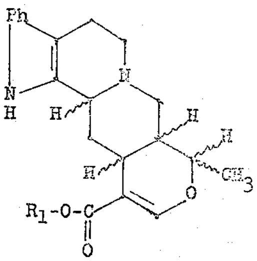

in which Ph and $R_1$ have the previously given meaning, with a lead-IV acylate in which acyl is the acyl radical of an acid selected from the group consisting of lower alkanoic acid, benzoic acid, (lower alkyl)-benzoic acid, (lower alkoxy)-benzoic acid, (halogeno)-benzoic acid and (nitro)- benzoic acid, in a neutral medium.

54. Process according to claim 53, which comprises using lead tetraacetate as the lead-IV acylate.

55. Process for the preparation of a compound of the formula:

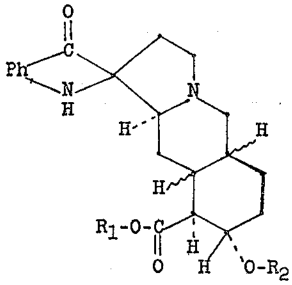

in which Ph is a member selected from the group consisting of 1,2-phenylene and (lower alkoxy)-1,2-phenylene, $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, and $R_2$ is a member selected from the group consisting of hydrogen, the acyl radical of a lower alkanoic acid and lower alkyl, which comprises treating a compound of formula:

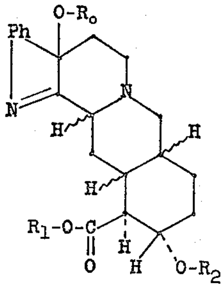

in which Ph, $R_1$ and $R_2$ have the previously given meaning and $R_o$ is a member selected from the group consisting of hydrogen and the acyl radical of an acid selected from the group consisting of lower alkanoic acid, benzoic acid, (lower alkyl)-benzoic acid, (lower-alkoxy)-benzoic acid, (halogeno)-benzoic acid and (nitro)-benzoic acid, with an alkali metal hydroxide.

56. Process according to claim 55, which comprises using sodium hydroxide as the alkaline reagent.

57. Process for the preparation of a compound of the formula:

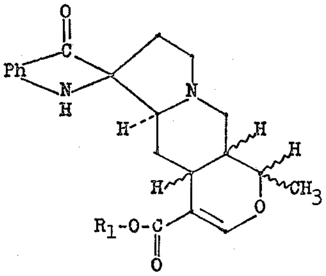

in which Ph is a member selected from the group consisting of 1,2-phenylene and (lower alkoxy)-1,2-phenylene, and $R_1$ is a member selected from the group consisting of lower alkyl, lower alkoxy-lower alkyl, in which lower alkoxy is separated from the carboxyl group by at least two carbon atoms, and N,N-di-lower alkyl-amino-lower alkyl, in which N,N-di-lower alkyl-amino is separated from the carboxyl group by at least two carbon atoms, which comprises treating a compound of the formula:

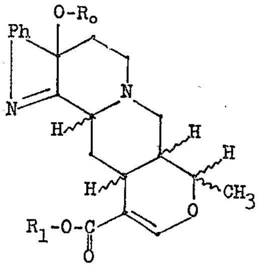

in which Ph and $R_1$ have the previously given meaning, and $R_o$ is a member selected from the group consisting of hydrogen and the acyl radical of an acid selected from the group consisting of lower alkanoic acid, benzoic acid, (lower alkyl)-benzoic acid, (lower alkoxy)-benzoic acid, (halogeno)-benzoic acid and (nitro)-benzoic acid, with an alkali metal hydroxyde.

58. Process according to claim 57, which comprises using sodium hydroxide as the alkaline reagent.

References Cited by the Examiner

Bartlett et al., Jour. Amer. Chem. Soc., vol. 81 (1959), pages 1932–1935.

Saxton, Quarterly Reviews, vol. 10, No. 1 (1956), pages 145–147.

WALTER A. MODANCE, *Primary Examiner.*

NICHOLAS S. RIZZO *Examiner.*

JAMES A. PATTEN, *Assistant Examiner.*